United States Patent [19]

Pohl

[11] 4,200,829
[45] Apr. 29, 1980

[54] CIRCUIT FOR PROTECTING INDUCTION MOTORS

[75] Inventor: Walter J. Pohl, Anchorage, Ky.

[73] Assignee: General Electric Company, Louisville, Ky.

[21] Appl. No.: 924,104

[22] Filed: Jul. 12, 1978

[51] Int. Cl.² .............................................. H02P 1/44
[52] U.S. Cl. ..................................... 318/782; 361/30; 361/33
[58] Field of Search .................. 318/782, 434; 361/29, 361/30, 33

[56] References Cited

U.S. PATENT DOCUMENTS

| | | | |
|---|---|---|---|
| 2,912,644 | 11/1959 | Makous | 324/62 |
| 3,329,869 | 7/1967 | Obenhaus | 361/27 |
| 3,913,342 | 10/1975 | Barry | 62/115 |
| 3,959,692 | 5/1976 | Wetzel | 361/24 |
| 3,974,430 | 8/1976 | Tyler et al. | 318/473 |
| 4,044,288 | 8/1977 | Godfrey | 361/29 X |
| 4,100,468 | 11/1978 | Slocum | 361/29 X |

Primary Examiner—Gene Z. Rubinson
Attorney, Agent, or Firm—Frank P. Giacalone; Radford M. Reams

[57] ABSTRACT

A circuit for protecting single phase induction motors of the type having a start winding connected in series with a start/run capacitor. The circuit contains a resistance bridge wherein the motor start winding forms one leg thereof. A d.c. signal is applied to the input terminals of the bridge. A filter is connected to the output terminals of the bridge so that a relatively ripple free d.c. output signal from the bridge can be applied to the positive input terminal of a d.c. comparator, the negative terminal of which is connected to d.c. reference ground. A reference resistor in a leg of the bridge adjacent the start winding is selected so that the bridge is unbalanced to present a positive d.c. signal to a terminal of the comparator so long as the resistance value of the start winding is less than the value of the reference resistor. An excessive temperature increase of the start winding raises its resistance to equal that of the reference resistor to cause the bridge to balance when the temperature of the start winding reaches a predetermined maximum value, whereupon the comparator switches from a conductive to a non-conductive state. An SCR connected to the comparator output controls the operation of a motor-protecting relay to disengage the motor from its driving source when the bridge becomes balanced and when the comparator switches from one output state to another. A re-start button connected across the SCR permits re-start of the motor after it has been disengaged from its driving source by operation of the comparator.

6 Claims, 1 Drawing Figure

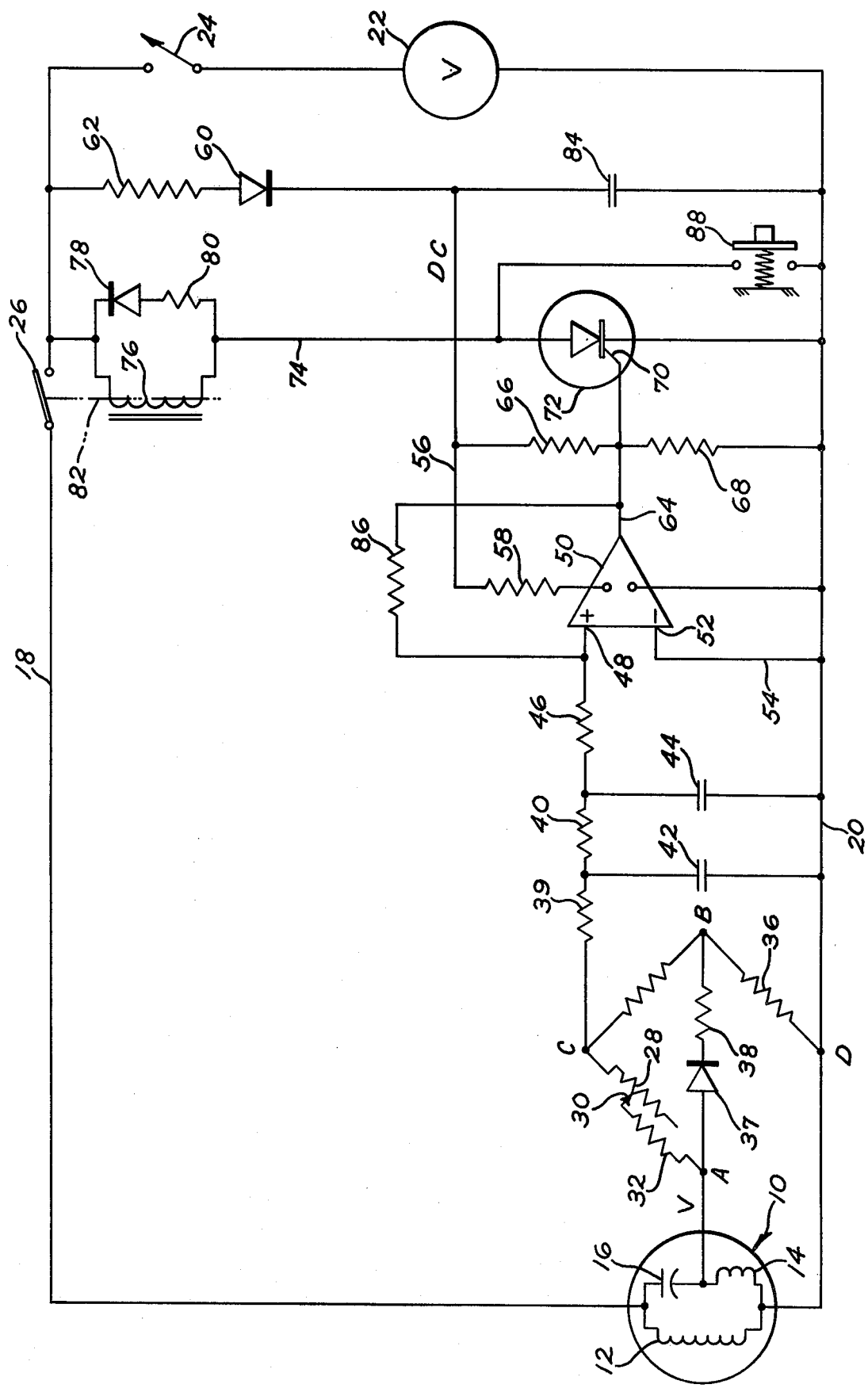

CIRCUIT FOR PROTECTING INDUCTION MOTORS

BACKGROUND OF THE INVENTION

This invention relates generally to circuits for protecting single phase induction motors from excessively high rotor winding temperatures brought about by excessive motor loads.

More specifically, the invention relates to the use of the balancing properties of a resistance bridge circuit to compare the motor start winding resistance, which is a function of its temperature, against that of a reference resistor. Numerous motor protection circuits for protection of induction motors against excessively high temperatures are, of course, well known in the art. Characteristically such prior art circuits employ temperature sensing elements, such as thermistors, to sense rotor winding temperature directly. Such temperature sensors are subject to failure, whereby several sensors are often employed by motor protection circuits to provide adequate back-up in case of a failure of one of the sensors.

By means of my invention, the use of temperature sensors in a motor protection circuit is avoided.

SUMMARY OF THE INVENTION

Briefly, in accordance with my invention, there is provided a protection circuit for a single phase induction motor of the type which includes a start winding and a capacitor connected in series. The circuit includes resistance bridge means wherein the start winding is connected to form one leg thereof. The bridge means is unbalanced for generating a d.c. output signal when the resistance of the start winding is less than a predetermined value, and balanced for nullifying said output signal when the start winding resistance is equal to the predetermined value. Filtering means is responsively connected to the bridge means for providing an essentially ripple free d.c. output signal when the bridge means is unbalanced. Comparing means is responsively connected to the filtering means for generating a first output condition when the bridge means is unbalanced, and for switching to a second output condition when the bridge means becomes balanced. Lastly, means is respectively connected to the comparing means for connecting the motor to a source of a.c. driving potential in response to the first condition and for disconnecting the motor from the source in response to the second condition.

Other objects, features and advantages of the present invention will become apparent to those skilled in the art from the following detailed description and attached drawing upon which, by way of example, only a preferred embodiment of my invention is illustrated.

BRIEF DESCRIPTION OF THE DRAWING

The drawing shows a schematic diagram of a protection circuit for a single phase induction motor, thus illustrating one preferred embodiment of my invention.

DESCRIPTION OF THE PREFERRED EMBODIMENT

Referring now to the drawing there is shown, in one preferred embodiment of my invention, a typical 230 volt, single phase induction motor 10 such as the type commonly used to drive a compressor in a modern air conditioning system. The motor 10 features a run winding 12 connected across the series combination of a start winding 14 and a start/run capacitor 16. The motor 10 is connected through a pair of main power lines 18, 20 to a suitable single phase, a.c. source 22. A manually operable main power switch 24 and a normally open motor protecting relay switch 26 are connected in the line 18 between one side of the motor 10 and source 22.

Now, in accordance with the principles of my invention, the start winding 14 is connected across points A and D of a normally unbalanced d.c. bridge circuit to form one leg thereof. A second leg of the bridge circuit between the points A, C consists of an adjustable potentiometer 28, an arm 30 of which is connected to a resistor 32. A third leg of the bridge circuit between the points B, C consists of a resistor 34 while a fourth leg thereof consists of a resistor 36. A d.c. driving potential to operate the bridge circuit is obtained by means of a diode 37 connected in series with a current limiting impedance, either an inductive reactance or a resistor 38, connected between the points A, B, the input terminals of the bridge.

The value of the potentiometer 28 is selected so that, upon proper adjustment, the sum of its resistance in series with the fixed resistor 32 can be made equal to the resistance of the resistor 34. The resistor 32 should be of relatively high value to act as a current limiting resistor should the arm 30 be adjusted so as to remove all of the resistance of the potentiometer 28 from the bridge leg A, C. The potentiometer 28 and resistor 32 represent convenient means for adjusting the bridge for use with different motors. For use with a given motor, the potentiometer 28 and resistor 32 may be replaced by a single resistor of fixed value. The resistance value of the resistor 36 should be selected so as to equal the d.c. resistance value of the start winding 14 when the start winding temperature has increased to a selected maximum permissible value, whereby the bridge circuit will become balanced and the d.c. potential across the points C, D will drop to zero. Consequently, so long as the temperature of the start winding 14 is less than the maximum permissible value selected, its d.c. resistance value will be less than the resistance value of the resistor 36, whereby the bridge circuit will be unbalanced so that a net d.c. potential will exist across the points C, D. For example, a d.c. resistance value of the start winding 14 will often be on the order of about 10 Ohms at room temperature, but will increase to about 14 Ohms as the temperature thereof increases to a maximum permissible value. Thus, in this case, the proper resistance value for the resistor 36 will be on the order of about 14 Ohms. In any case, the temperature-resistance characteristic of the motor start winding must be known before the value of the reference resistor 36 can be selected.

The d.c. output voltage appearing across the output side C, D of the bridge circuit is connected to a smoothing filter consisting of a pair of resistors 39, 40 and a pair of capacitors 42, 44 connected as shown. In turn, the output side of the smoothing filter is connected through a resistor 46 to a positive terminal 48 of a d.c. comparator 50, a negative terminal 52 of which is connected to the line 20. The line 20 acts as the equivalent of d.c. ground for the d.c. protective circuit of the present example and will hereafter be referred to as such. Accordingly, the negative terminal 52 is clamped by a line 54 to d.c. ground. The comparator 50 receives B+ through a d.c. bus 56 to which is connected a resistor 58, a diode 60, and a resistor 62, the latter also being connected to the main line 18 on the source side of the relay switch 26.

The output terminal of the comparator 50 is connected through an output line 64 to a voltage divider network consisting of a resistor 66 connected in series with a resistor 68 between the d.c. bus 56 and d.c. ground. The output line 64 is also connected to a gate 70 of an SCR 72. The cathode of the SCR is connected to the line 20 while its anode is connected through a line 74 to one side of a parallel circuit consisting of a relay coil 76 connected across a diode 78 and current limiting resistor 80. The coil 76 is operatively associated with the relay switch 26 as indicated by a dashed line 82. A filter capacitor 84 is connected between the d.c. bus 56 and the line 20 so that the bus 56 and line 20 float together in common with respect to a.c. potential.

A hysteresis or feedback loop for the comparator 50 is provided by means of a resistor 86 of high resistance value connected between the comparator's positive terminal 48 and output line 64. The loop provided by the resistor 86 clamps the positive terminal 48 essentially to ground when the comparator output line 64 is low (non-conductive comparator state) and increases the positive potential on the terminal 48 to essentially the same value as the potential on the output line 64 when the output line 64 is high (conductive comparator state). Thus, when the comparator 50 switches (which can only occur when the bridge circuit is balanced as a result of an increase in the temperature of the start winding 14 to the preselected maximum temperature), small positive ripples in the d.c. potential applied from the smoothing filter to the terminal 48 will not occur to falsely trigger the comparator 50 back into the conductive state. Without the resistor 86 connected between the output line 64 and the positive terminal 48, a small ripple in the d.c. potential presented to the terminal 48 from the smoothing filter of only a few millivolts could trigger the comparator 50 on or off at the frequency of the a.c. potential of the source 22, which in the present example would be 60 times per second. To complete the description of the circuit, a normally-open, spring-return re-start switch 88 is connected across the SCR 72 between the lines 20 and 74. Upon closure, the switch 88 by-passes the SCR 72 to connect the relay coil 76 directly across the main lines 18, 20 to allow manual restart of the motor 10 after the protective circuit has removed it from the source 22 due to excessively high start winding temperature.

The following table lists specific values for one complete example of the circuit of the present example. Those skilled in the art will appreciate that wide deviations from these suggested values are permitted within the scope of my invention.

TABLE

| CIRCUIT ELEMENTS | SUGGESTED VALUES |
| --- | --- |
| Motor 10 | Any single phase induction motor having a start winding connected in series with a start/run capacitor |
| Potentiometer 28 | 0–47K Ohms |
| Resistor 32 | 10K Ohms |
| Resistor 34 | 50K Ohms |
| Resistor 36 | 13.5 Ohms |
| Resistor 38 | 1000 Ohms |
| Resistor 39 | 1.5 Megohms |
| Resistor 40 | 1.0 Megohms |
| Resistor 46 | 0.3 Megohms |
| Resistor 58 | 350 Ohms |
| Resistor 62 | 10K Ohms |
| Resistor 66 | 6.8K Ohms |
| Resistor 68 | 1200 Ohms |
| Resistor 80 | 4K Ohms |
| Resistor 86 | 20 Megohm |
| Capacitor 42 | 0.22 μf (200v.) |
| Capacitor 44 | 1.0 μf (3v.) |
| Capacitor 84 | 100 μf (25v.) |
| SCR 72 | C106M (240v.) |
| Comparator 50 | M3302P (Motorola) |

In typical operation of the circuit of the present example, the temperature vs. d.c. resistance characteristic of the start winding 14 for a given motor 10 is obtained and the value of the resistor 36 is selected so as to equal the resistance of the start winding 14 when the latter reaches a specifically selected excessively high operating temperature at which it will be desired to de-energize the motor 10. For start winding temperature levels less than the maximum selected value, the bridge circuit A, B, C, and D will be unbalanced so that a d.c. potential will appear across the output side C, D of the bridge. The filter represented by resistors 39, 40 and capacitors 42, 44 present essentially pure d.c. across the input terminals 48, 52 of the comparator 50. So long as the operating temperature of the winding 14 is below the maximum value selected, the bridge A, B, C, D will remain unbalanced whereby the output line 64 of comparator 50 will remain high to keep the SCR 72 in a conductive state, and the relay coil 76 will remain energized to keep the switch 26 closed. As a consequence, the source 22 will remain connected across the motor 10 when the main switch 24 is closed.

Now as the temperature of the start winding 14 increases as the result of increased loading of the motor 10, the resistance of the start winding 14 will approach that of the resistor 36. As the start winding temperature increases, the d.c. voltage across the bridge output C, D as smoothed by the filter and presented to the terminal 48 of comparator 50, will drop in value. Ultimately, if the start winding temperature rises to the excessive high maximum or prohibited value selected, the d.c. voltage at the terminal 48 will drop to zero, at least at some point during a given cycle of a.c. potential generated by the source 22, whereupon the comparator output line 64 will immediately switch from a high to a low potential. When the output line 64 goes low in terms of the d.c. potential thereon, the SCR 72 will switch to a non-conductive state and the relay coil 76 will become de-energized to open the switch 26 and remove the motor 10 from across the source 22. Now, to restart the motor 10 after the switch 26 has opened, the switch 88 is manually closed to shunt the SCR 72, thereby energizing the coil 76 and reclosing the switch 26. If the temperature of the start winding has dropped sufficiently between the time the comparator 50 switched the output line 64 to a low voltage state, and the time the switch 88 is manually depressed, then the motor 10 will start and remain across the source 22 until the start winding temperature again climbs to the prohibited value.

Initial starting of the motor 10 is accomplished simply by closing the switch 24, provided the comparator 50 has not switched the output line 64 to a low potential since the main switch 24 was last opened. This is possible because, upon closure of the switch 24 to initially start the motor 10, a B+ voltage is thereby applied by the bus 56 to the comparator 50 to cause its output line 64 to go just high enough, about 0.5 volts, to place approximately the same potential on the positive terminal 48 through the resistor 86. Accordingly, this is a sufficient potential difference across the terminals 48, 52 to switch the comparator output line 64 to a high potential level, whereupon the positive terminal 48 will remain high until the bridge becomes balanced as the result of an excessively high start winding temperature.

Although the present invention has been described with respect to specific details of a certain preferred embodiment thereof, it is not intended that such details limit the scope of coverage hereof otherwise than as set forth in the following claims.

I claim:

1. A protection circuit for a single phase induction motor of the type comprising a start winding and a capacitor connected in series, said circuit comprising resistance bridge means, said start winding being connected in said bridge means to form one leg thereof, said bridge means being unbalanced for generating a d.c. output signal when the resistance of said start winding is less than a predetermined value, said bridge means being balanced for nullifying said output signal when said start winding resistance is equal to said value, filtering means responsively connected to said bridge means for providing an essentially ripple-free d.c. output signal when said bridge means is unbalanced, comparing means responsively connected to said filtering means for generating a first output condition when said bridge means is unbalanced and for switching to a second output condition when said bridge means becomes balanced, and means responsively connected to said comparing means for connecting said motor to a source of a.c. driving potential in response to said first condition and for disconnecting said motor from said source in response to said second condition.

2. The circuit of claim 1 wherein said comparing means comprises a d.c. comparator.

3. The circuit of claim 1 wherein said motor connecting means comprises an SCR responsively connected to said comparing means, and a relay responsively connected to said SCR and operatively associated with said motor.

4. The circuit of claim 1 further comprising means for restarting said motor after said comparing means switches from said first condition to said second condition.

5. The circuit of claim 1 further comprising means for applying a d.c. driving potential across a pair of input terminals of said bridge means.

6. The circuit of claim 3 further comprising means for shunting said SCR for energizing said relay to reconnect said motor to said a.c. driving source after said comparing means has switched from said first condition to said second condition.

* * * * *